United States Patent [19]

Bowes et al.

[11] 4,388,177

[45] Jun. 14, 1983

[54] PREPARATION OF NATURAL FERRIERITE HYDROCRACKING CATALYST AND HYDROCARBON CONVERSION WITH CATALYST

[75] Inventors: Emmerson Bowes, Woodstown; Bruce P. Pelrine, Trenton, both of N.J.

[73] Assignee: Mobil Oil Corporation, New York, N.Y.

[21] Appl. No.: 355,439

[22] Filed: Mar. 8, 1982

Related U.S. Application Data

[62] Division of Ser. No. 225,079, Jan. 13, 1981, Pat. No. 4,335,019.

[51] Int. Cl.$^3$ .............................................. C10G 47/18
[52] U.S. Cl. .............................. 208/111; 208/DIG. 2; 208/59; 208/138
[58] Field of Search ................. 208/111, DIG. 2, 59, 208/138

[56] References Cited

U.S. PATENT DOCUMENTS

| | | | |
|---|---|---|---|
| 3,663,430 | 5/1972 | Morris | 208/111 |
| 3,928,174 | 12/1975 | Bonacci et al. | 208/80 |
| 4,025,575 | 5/1977 | Chang et al. | 585/640 |
| 4,278,564 | 7/1981 | Pelrine | 252/450 |
| 4,335,019 | 6/1982 | Bowes et al. | 252/450 |

*Primary Examiner*—Delbert E. Gantz
*Assistant Examiner*—G. E. Schmitkons
*Attorney, Agent, or Firm*—C. A. Huggett; M. G. Gilman; S. Aksman

[57] ABSTRACT

A shape-selective hydrocracking catalyst prepared by making a composite of a hydrogenation component and a natural ferrierite that has been treated with oxalic acid to impart thereto catalytic activity for converting slightly branched as well as straight chain hydrocarbons. The catalyst is useful for hydrodewaxing and for upgrading naphtha.

14 Claims, No Drawings

PREPARATION OF NATURAL FERRIERITE HYDROCRACKING CATALYST AND HYDROCARBON CONVERSION WITH CATALYST

This is a division of copending application Ser. No. 225,079, filed Jan 13, 1981 now U.S. Pat. No. 4,335,019.

BACKGROUND OF THE INVENTION

1. Field of the Invention

This invention relates to a method for modifying the activity and shape selectivity of natural ferrierite so that hydrocarbons are cracked selectively. In particular, it is concerned with a method for making a shape-selective hydrocracking catalyst from natural ferrierite, and with a process for upgrading certain hydrocarbons by shape-selectively cracking the paraffins contained therein. The process may be used to increase the octane number of reformate, or to dewax a waxy-hydrocarbon to reduce its pour point.

2. Description of the Prior Art

Zeolitic materials, both natural and synthetic, have been demonstrated in the past to have catalytic properties for various types of hydrocarbon conversions. Certain zeolitic materials are ordered, porous crystalline aluminosilicates having a definite crystalline structure as determined by X-ray diffraction. Within these crystals there are numerous small cavities which are interconnected by a number of still smaller channels or pores. These cavities and pores are precisely uniform in size and placement within a specific zeolitic material. Since the dimensions of these pores are such as to accept for absorption only molecules of certain dimensions while rejecting those of larger dimensions, these materials have come to be known as "molecular sieves" and may be utilized to take advantage of this property.

Such molecular sieves, both natural and synthetic, include a wide variety of positive ion-containing crystalline aluminosilicates. These aluminosilicates can be described as rigid three-dimensional frameworks of $SiO_4$ and $AlO_4$ tetrahedra that are cross-linked by the sharing of oxygen atoms whereby the ratio of the total aluminum and silicon atoms to oxygen atoms is 1:2. The electrovalence of the tetrahedra containing trivalent aluminum is balanced by the inclusion in the crystal of a cation such as an alkali metal or an alkaline earth metal cation. This can be expressed wherein the ratio of aluminum to the number of various cations, such as $Ca/2$, $Sr/2$, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The cavities and channels of the crystal are occupied by molecules of water prior to dehydration.

Prior art techniques have resulted in the formation of a great variety of synthetic aluminosilicates. These aluminosilicates have come to be designated by letter or other convenient symbols, examples of which are zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-23 (U.S. Pat. No. 4,076,842), zeolite ZSM-35 (U.S. Pat. No. 4,016,245) and zeolite ZSM-38 (U.S. Pat. No. 4,046,859).

It is well known in the prior art that certain zeolites such as zeolites A, X, or Y and the naturally occurring zeolites chabazite, erionite, faujasite and mordenite can be stability-enhanced by methods comprising ion exchange and/or heating. U.S. Pat. Nos. 3,354,077; 3,375,065; and 3,402,996 describe such methods. U.S. Pat Nos. 3,997,474 and 4,054,511 to Miale et al, on the other hand, describe a method for activating naturally occurring ferrierite to make it selective primarily for cracking normal paraffins by treatment with ammonium ions and HF. The preparation and use of synthetic ferrierite to increase the octane number of reformates is described by Gianetti et al in Ind. Eng. Chem., Process Design Dev., Vol. 14, No. 1, 1975, pp. 86–92, the entire content of which, including literature cited, is incorporated herein by reference. Also incorporated by reference is Re. 28,398 to Chen et al which describes shape-selective dewaxing with zeolite catalysts.

SUMMARY OF THE INVENTION

In accord with the present invention, a method of modifying the shape selectivity of natural ferrierite, allowing branched-chain hydrocarbons to be cracked selectively, has been found which comprises contacting natural ferrierite with oxalic acid under controlled conditions of time and temperature. By this method, the catalytic properties of naturally occurring ferrierite may be enhanced in that the treated ferrierite exhibits a more open pore system with respect to the untreated ferrierite allowing hydrocarbons, other than normals, to be cracked. Moreover, by exchanging the above treated ferrierite with diammonium oxalate, a more useful cation (ammonium) is exchanged into the ferrierite while simultaneously chelating the exiting cation. Thus, any iron present as an impurity is removed as a chelate thereby eliminating excess methane production for certain reactions. For purposes of this invention, the modified natural ferrierite is composited with a hydrogenation-dehydrogenation metal, preferably platinum. The catalyst is a very effective shape-selective hydrocracking catalyst, and it may be used for catalytic dewaxing or for upgrading the octane number of reformates.

DESCRIPTION OF PREFERRED EMBODIMENTS

The zeolite useful in the practice of this invention is natural ferrierite. The naturally occurring ferrierite has been described by Graham (Roy. Soc. Canada, Proc. and Trans., 3rd Ser., 12, 185–190) and by Staples (Am. Mineral, 40 1095-99). The formula of the natural mineral ferrierite is given as $(Na,/K)_4Mg_2(Si_{30}Al_6)O_{72}\cdot(OH)_2\cdot18H_2O$. The oxide formula is given in "Zeolite Molecular Sieves", John Wiley and Sons, Inc. (1974) as $(Na_2, Mg)O\cdot Al_2O_3\cdot 11.1SiO_2\cdot 6.5H_2O$.

The ferrierite ore employed as starting material in the method of this invention is an ore having about 95% ferrierite which has a very low hexane cracking activity ($\alpha < 1$). When it is ion exchanged to its ammonium form and calcined, this material is stable, moderately active ($\alpha$ ranging from 25–200) and selective for cracking straight chain hydrocarbons. These characteristics of ammonium ferrierite are not altered by successive conventional ion exchanges with ammonium salts.

Cracking activity is also indicated quantitatively by the term alpha ($\alpha$) which is a measure of the relative activity of the catalyst for cracking normal hexane compared to a highly active amorphous silica alumina cracking catalyst taken as $\alpha=1$.

The $\alpha$-test is further described in a letter to the editor entitled "Superactive Crystalline Aluminosilicate Hydrocarbon Cracking Catalysts" by P. B. Weisz and J. N. Miale, Journal of Catalysis, Vol. 4, pp. 527–529 (August 1965). For additional description of the $\alpha$-test see U.S. Pat. No. 3,354,078 issued to Miale and Weisz, the contents of which are herein incorporated by reference.

In carrying out the present process, natural ferrierite is subjected to contact, in one embodiment, with aqueous oxalic acid followed by exchange with an aqueous 1 M diammonium oxalate solution. Oxalic acid treatment can be (1) metered over a period of time (2) by refluxing, and (3) in an autoclave with stirring. Concentration of the oxalic acid can be between about 1 and 12%. Molarity of the diammonium oxalate may be between about 0.1 and 10. Temperature conditions for oxalic acid treatment are between about room temperature and 200° C., for exchange treatment between about room temperature and 100° C., while contact time for both treatments is for about 1 to 10 days.

By the foregoing treatment, the zeolitic pore system may be made, in effect, more open. The result of this enhancement of a more open pore system is that branched hydrocarbons, such as 3-methylpentane and 2,3-dimethylbutane may be cracked selectively. Because of this resultant ability to crack branched hydrocarbons selectively, the invention treated ferrierite can be expected to exhibit catalytic properties similar to zeolite ZSM-35, its synthetic analog (U.S. Pat. No. 4,016,245). The term "shape-selective" as used herein means that the natural ferrierite treated according to this invention will effectively crack or hydrocrack straight chain hydrocarbons and single methyl branched hydrocarbons, with lesser or substantially no activity for more highly branched structures. An effective test that has been extensively used to characterize a pore size such as is exhibited by the natural ferrierite treated according to this invention involves cracking a mixture of normal hexane and 3-methylpentane and calculating the ratio of first order rate constants for the two hydrocarbons. This ratio has been described as the "Constraint Index," and the test method and computation are fully described in U.S. Pat. No. 4,025,575 beginning Col. 5, line 29 to Col. 6, line 43, which description is herein incorporated by reference as if fully set forth. The treated natural ferrierite will have a Constraint Index from about 1 to 12.

For purposes of the present invention, the natural ferrierite treated as described is combined by base exchange or by impregnation with a hydrogenation component comprising at least one member of the group consisting of Group VIA and Group VIII metals in a form capable of promoting hydrogenation reactions. The metals of Group VIA as they are shown in the periodic table are chromium, molybdenum and tungsten. Combinations of metals such as cobalt and molybdenum,, and nickel and tungsten, may be used, preferably in the sulfided form. The preferred hydrogenation component is platinum, palladium, or mixtures thereof, in an amount not exceeding 2 wt.% of the total catalyst. The hydrogenation component, in general, may constitute from about 0.1% to 25 wt.% of the catalyst.

As in the case with many catalysts, it may be desirable to incorporate the completed catalyst with another material resistant to the usual conditions employed in organic conversion processes. Such materials include active and inactive materials and synthetic or naturally occurring zeolites as well as inorganic materials such as clays, silica and/or metal oxides. The latter may be either naturally occurring or in the form of gelatinous precipitates, sols or gels, including mixtures of silica and metal oxides. Frequently, the zeolite materials have been incorporated into alumina or naturally occurring clays, e.g. bentonite and kaolin. These materials, i.e., clays oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the modified ferrierite of this invention include the montmorillonite and kaolin family, which families include the sub-bentonites, and the kaolins commonly known as Dixie, McNamee, Georgia and Florida clays or others in which the main mineral constituents are halloysite, kaolinite, dickite, nacrite, or anauxite. Such clays can be used in the raw state as originally mined or initially subjected to calcination, acid treatment or chemical modification.

In addition to the foregoing materials, the catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. A mixture of these components could also be used. The relative proportions of finely divided activated and inorganic oxide gel matrix may vary widely with the ferrierite content ranging from about 1 to about 90 percent by weight and more usually in the range of about 2 to about 80 percent by weight of the composite.

The catalyst provided by this invention is particularly effective in a process in which it is desired to selectively convert normal (straight-chain) paraffins to lower molecular weight hydrocarbons by hydrocracking. The catalyst of this invention is particularly attractive because it is derived by relatively inexpensive treatment of a natural mineral.

Reformate prepared from a naphtha boiling in the range of from about $C_5$ up to about 380° F. or higher by contact with a platinum reforming catalyst usually contains normal paraffins which depreciate its octane number seriously. By selectively hydrocracking the normal and slightly branched paraffins with the catalyst of this invention, the octane number is improved. U.S. Pat. No. 3,395,094 describes conditions effective for such a conversion, and is incorporated herein by reference. In general, a naphtha boiling range material which has been contacted with a platinum reforming catalyst under typical reforming conditions, including a temperature in the range of about 800° F. to 1000° F., is contacted in the presence of hydrogen at a temperature of about 500° to about 1000° F., a pressure from about 50 up to as high as 5000 psig, at a liquid hourly space velocity in the range of about 0.1 to about 40 and a hydrogen to hydrocarbon mol ratio in the range of from about 0.1 to about 40. The effluent product, after separation of the light ends, will have an aromatic content and an octane number higher than that of the reformate and a lower content of paraffins, especially normal paraffins.

The catalyst of this invention is particularly effective for dewaxing and reducing the pour point of a waxy hydrocarbon oil, as will be illustrated further hereinbelow. Any hydrocarbon oil that contains normal paraffins may be used as feed to the process. Dewaxing such a feed is illustrated for different hydrocarbon oils in U.S. Pat. Nos. Re. 28,398 and in 3,956,102 and in 4,137,148, for example. The entire contents of these patents are herein incorporated by reference. The dewaxing step may be conducted with or without hydrogen, although use of hydrogen is preferred. It is contemplated to conduct the dewaxing step at the dewaxing conditions shown in Table I.

TABLE I

| DEWAXING CONDITIONS | | |
|---|---|---|
| | Broad | Preferred |
| *Without Hydrogen* | | |
| Temperature, °F. | 400–1000 | 500–800 |
| LHSV, hr$^{-1}$ | 0.3–20 | 0.5–10 |
| Pressure, psig | 0–3000 | 50 to 1500 |
| *With Hydrogen* | | |
| Temperature, °F. | 400–1000 | 500–800 |
| LHSV, hr$^{-1}$ | 0.1–10 | 0.5–4.0 |
| H$_2$/HC mol ratio | 1–20 | 7–10 |
| Pressure, psig | 0–3000 | 200–1500 |

In order to more fully illustrate the nature of the invention and the manner of practicing same, the following non-limiting examples are presented.

The examples below describe the various treatments of natural ferrierite and the catalytic results, corresponding to and emanating from the catalyst products produced by the methods described therein.

EXAMPLE 1

This may be considered the base case or a conventional method by which ferrierite is converted into the ammonium form and subsequently to the acid form by air calcination.

The treatment (ion exchange) was made by refluxing 30 gms. of ammonium nitrate with 10 gms of ferrierite in 30 cc H$_2$O for 3 days. At the end of 3 days, the NH$_4$-ferrierite was washed thoroughly with water and dried. The resulting NH$_4$-ferrierite was then calcined at 1° C./min to 538° C. and held at 538° C. for 3 hours.

EXAMPLE 2

5.0 gms of ferrierite were placed into 300 cc of 1 M diammonium oxalate and refluxed for 3 days. After 3 days, the NH$_4$-ferrierite was washed and dried at 120° C. for 3 hours. Calcination of this sample was as in Example 1.

EXAMPLE 3

In this treatment, oxalic acid was used. 26.8 gms of ferrierite were placed into 200 cc of H$_2$O and heated to reflux. 4.56 gm of oxalic acid was dissolved into 100 cc of H$_2$O. The 100 cc solution of oxalic acid was then pumped into the ferrierite/H$_2$O solution at 4 cc/hr. After 25 hours, complete addition of the oxalic acid solution was made. The resulting ferrierite was washed and then exchanged with 600 cm 1 M diammonium oxalate at reflux for 2 days. At the end of the exchange, the resulting NH$_4$-ferrierite was washed and dried. Calcination followed as in Example 1. The product had a constraint index of 4.5.

EXAMPLE 4

10 gm of ferrierite were refluxed, directly, with 4.5 gm oxalic acid in 100 cc H$_2$O for 3 days. After 3 days, the ferrierite was washed and dried as before. The sample was exchanged with 42 gm of diammonium oxalate in 300 cc H$_2$O at reflux for 3 days. After ion exchange, the resultant NH$_4$-ferrierite was washed and dried. Calcination followed as in Example 1.

EXAMPLE 5

This particular treatment involved the use of a stirred autoclave in the enhancement of ferrierite. 25 gm of oxalic acid were placed into 200 cc of H$_2$O in a 1000 cc autoclave. Then 10 gm of ferrierite were added. The autoclave was sealed and heated to 175° C. with stirring. After 8 days, the ferrierite was removed. Recovered 7.6 gm. The ferrierite (7.6 gm) was ion-exchanged with 30 gm of diammonium oxalate in 300 cc H$_2$O at reflux for 5 days. The resulting NH$_4$-ferrierite was washed and dried. Calcination followed as in Example 1.

Analytical results for the variously treated ferrierite samples of Examples 1–5 are shown in Table II.

TABLE II

| Analysis | Ferrierite Starting Material | Example | | | | |
|---|---|---|---|---|---|---|
| | | 1 | 2 | 3 | 4 | 5 |
| SiO$_2$ | 67.3% | 69.5% | 71.6% | 71.9% | 73.6% | 84.8% |
| Al$_2$O$_3$ | 12.1 | 12.6 | 12.9 | 12.3 | 11.7 | 11.3 |
| Na | 1.70 | 0.21 | 0.19 | 0.19 | 0.18 | 0.13 |
| Ca | 0.19 | 0.03 | 0.15 | 0.04 | 0.07 | — |
| K | 4.40 | 4.10 | 3.67 | 3.70 | 3.51 | 2.70 |
| Mg | 0.31 | 0.21 | 0.22 | 0.21 | 0.23 | 0.11 |
| Fe | 0.75 | 0.75 | 0.098 | 0.092 | 0.039 | 0.30 |

Examination of Table II shows the effect of the various treatments on the cation concentration in the resulting ferrierites. The treatment of Example 1 (NH$_4$NO$_3$) is only modestly effective, especially for removal of potassium and iron. The remaining treatments seem especially effective for iron removal and exchange of the various cations. A high degree of sodium and calcium exchange was evident. When the autoclave treatment was employed, potassium removal was enhanced. Also, the level of magnesium was further reduced by the autoclave treatment. Crystallinity after autoclave treatment is shown below in Table III.

TABLE III

| Crystallinity of Treated Ferrierites | |
|---|---|
| TREATMENT | CRYSTALLINITY[1] |
| Initial | 100 |
| 1 | 95 |
| 2 | 117 |
| 3 | 104 |
| 4 | 124 |
| 5 | 76 |

[1]Relative to ferrierite starting material

EXAMPLES 6–10

In Table IV, listing the results of Examples 6–10 in tabular form, are shown the catalytic results for cracking of a 1:1:1 (by wt.) mixture of normal hexane, 3-methylpentane and 2,3-dimethylbutane at 1000° F. and 1 atmosphere pressure. Included in the table are results for conversion of the above and calculated rate constants.

TABLE IV

| Example | FERRIERITE TREATMENT | Wt. % Converted | | | Rate Constants, K | | | $K_{C6}/K_{MP}$ | $K_{MP}/K_{DM}$ |
| --- | --- | --- | --- | --- | --- | --- | --- | --- | --- |
| | | $C_6$ | MP | DMB | $C_6$ | MP | DMB | | |
| 6 | NH$_4$NO$_3$ (Product of Example 1) | 43.0 | 0 | 0 | 0.203 | — | — | — | — |
| 7 | Diammonium Oxalate (Product of Example 2) | 50.4 | 0 | 0 | 0.180 | — | — | — | — |
| 8 | Oxalic Acid-Metered (Product of Example 3) | 59.3 | 29.0 | 24.2 | 0.246 | 0.098 | 0.076 | 2.5 | 1.3 |
| 9 | Oxalic Acid-Reflux (Product of Example 4) | 44.7 | 2.9 | 2.3 | 0.174 | 0.0086 | 0.0068 | 19 | 1.3 |
| 10 | Oxalic Acid-Autoclave (Product of Example 5) | 32.8 | 11.5 | 8.9 | 0.151 | 0.047 | 0.036 | 3.1 | 1.3 |

As can be seen from the results shown in Table IV for cracking of n-hexane, 3-methylpentane and 2,3-dimethylbutane, the treatment of Examples 3–5 have enhanced ferrierite to the extent that it now is more open and therefore cracks selectively the branched hydrocarbons, 3-methylpentane and 2,3-dimethylbutane.

On the other hand, ammonium nitrate and diammonium oxalate (treatments of Examples 1 and 2) while making the ferrierite active, did nothing to enhance the openness of the porous system as witnessed by the lack of cracking of the branched hexanes. Only when oxalic acid was used are the branched hexanes cracked selectively. It is interesting to compare these observations with the elemental analyses. Looking at cation contents, there is no obvious explanation of why ammonium nitrate and diammonium oxalate treatments do not yield a ferrierite which will crack the branched hexanes, since the concentrations of cations remaining after all treatments are not dissimilar. It may be that it is not the gross level of cations remaining after treatment, but their positions within the structure of the ferrierite which is important. In other words, the siting of some of the cations will determine whether or not the more bulky hexanes gain access to a cracking site.

Also noteworthy is that most of the treated ferrierites are shape selective for the isohexanes (i.e., methylpentane > dimethylbutane). This is illustrated by the relative rate constants, $K_{mp}/K_{dmb}$. For the treatments of Examples 3, 4 and 5, the ratio exceeds unity.

EXAMPLE 11

Uncalcined ferrierite (6.0 g) prepared in Example 3 was exchanged with 0.210 g [(NH$_3$)$_4$ Pt(II)Cl$_2$] in 15 cc H$_2$O at 50° C. overnight. The platinum ammine chloride catalyst was washed with H$_2$O and dried. Analysis showed 0.39 wt.% Pt on ferrierite (theory 2.0%).

This Pt/ferrierite was then mixed with Kaiser alumina to form a finished catalyst, slugged and sized to 10–14 mesh and calcined to 1000° F. for 1 hour. The formulation was 65% ferrierite, 35% alumina.

EXAMPLE 12

For comparison, a catalyst was prepared by thoroughly exchanging 40 g of the same ferrierite (Norton Z700, lot 43050) three times at reflux temperature with 1 molar ammonium nitrate for 24 hours, followed by three exchanges with 1 molar tetramethyl ammonium bromide. The TMA+/NH$_4$+ ferrierite was dried and 21.3 g (equivalent to 20 g calcined zeolite) was exchanged with 0.1 g platinum as platinum ammine chloride in 30 ml water added dropwise to a 30 ml slurry of the ferrierite in water. The addition was made overnight and lasted 18 hours. The slurry was filtered and washed with water to chloride-free condition. No platinum was found in the filtrate or washings. The ferrierite was dried and the temperature raised over 4–5 hours to 1000° F. and held for 1 hour. A blend of 5 g of the 0.5% Pt/ferrierite was made with 3.7 g of 73% alumina ($\alpha$ alumina monohydrate), slugged, granulated to 10–14 mesh and calcined as before for 1 hour at 1000° F. The final formulation corresponded to 65% ferrierite-35% alumina.

EXAMPLE 13

The catalyst of Example 11 (4.67 g) was loaded into a ½" dia. microreactor. The reactor was purged with nitrogen, then hydrogen at atmospheric pressure. Pressure was increased to 1000 psig and flow established at 175 cc/min. (STP) and the temperature raised to 500° F. overnight. Arab Light gas oil (pour point 65° F.) was pumped into the top of the reactor at 1 to 12 cc/hr. and the temperature adjusted to 800° F. in stages to obtain good conversion. At 800° F., 1000 psig and approximately 0.15 LHSV, conversion to product boiling below 330° F. was 21.5% by GLC measurement. The product was accumulated and distilled to remove 330° F. overhead material. The residue had a pour point of −55° F. (ASTM D97).

EXAMPLE 14

The catalyst of Example 12 (4.76 g) was loaded into the same micro unit used in Example 13 and started up by the same procedure.

At 800° F., 1000 psig and 0.15 LHSV, conversion to product boiling below 330° F. was 7.2%. The residue from distilling the product had an ASTM D97, pour point of +55° F.

EXAMPLE 15

The same natural ferrierite (Norton Z700, lot 43050) was first exchanged by silver, then ammonium thiocyanate, a procedure well known for effectively converting some zeolites to the ammonium-exchanged form. Platinum was added in the same manner but 2% wt. was used. Conversion was less than 3% at 800° F., 1000 psi and 0.25 LHSV.

Whereas the present invention is concerned with a shape selective hydrocracking catalyst composition made with a treated natural ferrierite cracking component, and with the method of making, and the process of hydrocracking with, this hydrocracking catalyst, U.S. patent application Ser. No. 089,691 (now U.S. Pat. No. 4,278,564) filed Oct. 30, 1979 by one of us now U.S. Pat. No. 4,278,564 describes the same composition without the hydrogenation component, and its use in shape-selective cracking. The entire content of U.S. Pat. No. 4,278,564 is intended to be incorporated herein either by reference or by actual inclusion.

What is claimed is:

1. A process for selectively hydrocracking straight chain and single methyl-branched hydrocarbons from a feed selected from the group consisting of reformate and waxy hydrocarbon oil comprising contacting said feed and hydrogen under conversion conditions with a catalyst composition comprised of natural ferrierite treated by contacting it with an oxalate ion under conditions effective to impart to the ferrierite a Constraint Index from about 1 to 12, the ferrierite further comprising at least one hydrogenation component selected from the metals of Group VIA and Group VIII of the Periodic Table.

2. The process of claim 1 wherein said feed is a waxy hydrocarbon oil, said process further including the step of recovering a dewaxed oil of reduced pour point.

3. The process of claim 2 wherein said hydrogenation component comprises platinum.

4. The process of claim 2 wherein said hydrogenation component comprises palladium.

5. The process of claim 2 wherein said hydrogenation component comprises cobalt and molybdenum.

6. The process of claim 2 wherein said hydrogenation component comprises nickel and tungsten.

7. The process of claim 3 wherein said hydrogenation component further comprises palladium.

8. The process of claim 3 wherein said hydrogenation component is present in the catalyst in an amount of up to 2 wt. %.

9. The process of claim 4 wherein said hydrogenation component is present in the catalyst in an amount of up to 2 wt. %.

10. The process of claim 7 wherein said hydrogenation component is present in the catalyst in an amount of up to 2 wt. %.

11. The process of claim 1 wherein normal paraffins are converted to lower molecular weight hydrocarbons.

12. The process of claim 11 wherein said conversion comprises dewaxing of a waxy hydrocarbon oil.

13. The process of claim 12 wherein the dewaxing is conducted at a temperature of 400°–1000° F., a pressure of 0–3000 psig, hydrogen/hydrocarbon mole ratio of 1–20 and at 0.1–10 1/hr liquid hourly space velocity (LHSV).

14. The process of claim 13 wherein the dewaxing is conducted at a temperature of 500°–800° F., a pressure of 200–1500 psig, hydrogen/hydrocarbon mole ratio of 7–10 and at 200–1500 1/hr LHSV.

* * * * *